Aug. 25, 1936.  L. T. BARNES  2,052,160
PISTON RING
Filed April 23, 1935
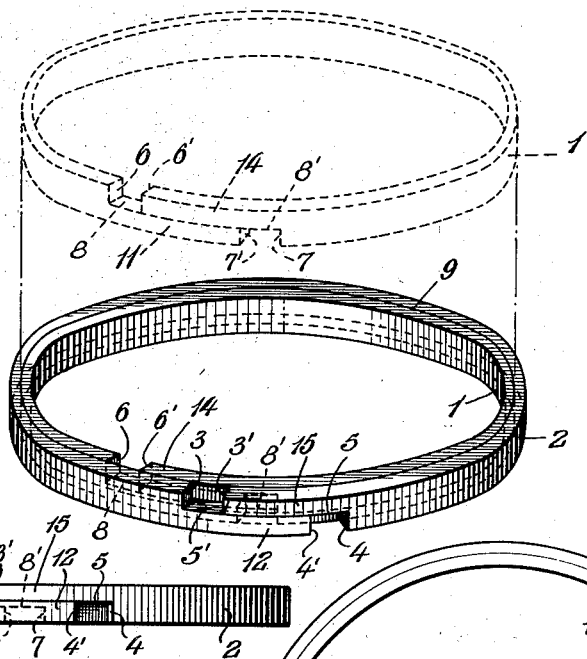
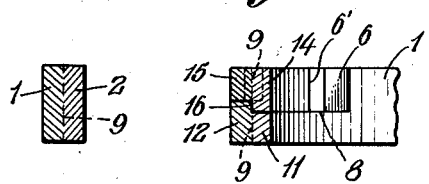
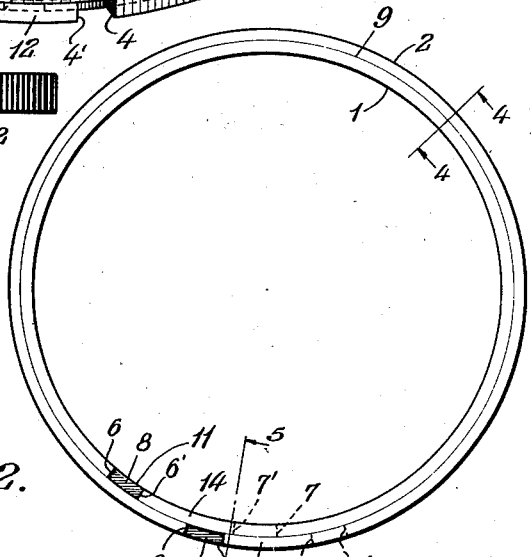
INVENTOR
Llewellyn T. Barnes,
BY
John Wagner
ATTORNEY Patented Aug. 25, 1936

2,052,160

UNITED STATES PATENT OFFICE 2,052,160

PISTON RING

Llewellyn T. Barnes, Hempstead, N. Y.

Application April 23, 1935, Serial No. 17,846

6 Claims. (Cl. 309—29)

The object of this invention is to provide a piston ring of two or even more nested sections of the same or different metal or metals, united into virtually a single integral ring.

A further object is to reduce the cost of manufacture by employing the same metal working operations for each ring section and then nesting the rings in a manner to provide stepped joints in all directions in which leakage is likely to occur.

A further object of the invention is to control the change of spring tension of the ring by making the inner ring section of a material having a different coefficient of expansion from that of the other ring section.

With these and other objects in view as will be pointed out as the description proceeds, reference will be had to the accompanying drawing, wherein:—

Figure 1 is a perspective view of a complete piston ring showing the inner section thereof projected in dotted lines, Figure 2 is a top plan view, Figure 3 is a side elevation, Figure 4 is a vertical sectional view taken on the line 4—4 of Fig. 2, and Figure 5 is a similar view taken on line 5—5 of Fig. 2.

In the drawing, reference numerals 1 and 2 respectively indicate inner and outer ring sections which make up the complete piston ring. The outer ring section is provided with a step-joint made by offset vertical cuts and a connecting horizontal cut providing vertical joint-walls 3—3', 4—4', and horizontal joint-walls 5—5'. The inner ring section is similarly provided with vertical joint-walls 6—6', 7—7' and horizontal joint walls 8—8'. The horizontal walls 5—5' of the inner ring section are cut in a different plane from the horizontal joint walls 8—8', so that the joint occurring between the walls 5—5' of one section will be offset from the joint occurring between the walls 8—8' of the other section, as illustrated in Fig. 2, thereby preventing direct communication between the horizontal joints of the two rings when nested. This offsetting is produced by making the walls 4—4' and 6—6' longer than the walls 3—3' and 7—7'.

The joints between the walls 3—3' and 6—6' are offset from each other, as are also the joints between the walls 4—4' and 7—7' of the respective ring sections, due to one ring being turned around within the other a predetermined number of degrees during assembly.

In producing these step-joints, each ring section undergoes the same metal working operations, and in assembling, it is only necessary to turn one of the ring sections over, top for bottom, and then to nest them, with one turned within the other a number of degrees, to cause all of the various joints of one ring section to become offset from similar joints of the other ring section, thereby preventing all direct communication between corresponding joints of the ring sections. It will also be observed that there are no intersecting joints between the ring sections.

After the ring sections are nested, they are secured together in a manner to effectively seal the joint 9, between their adjacent inner and outer faces, against leakage. This may be done by pinning, riveting, or fusing the ring sections together. By fusing is meant, soldering, brazing, welding, and the like, and fusing is preferable to pinning or riveting since it affords an absolute sealing of the joint 9, and virtually bonds the ring sections into a single integral ring. The fusing may be general throughout the full adjacent faces of the ring sections or local to certain portions of the faces or edges.

By providing the rings separately with their joints and then joining them into a single ring, a joint is provided for the latter that could not be formed by any practical metal working operations.

The sealing tongue 11 of the inner ring section is fused or otherwise attached to the corresponding tongue 12 and the sealing tongue 14 of the inner ring section is similarly attached to the corresponding tongue 15 of the outer ring section. When the ring as a whole is contracted, the tongue 11 of the inner section slides beneath the tongue 14 of the same ring and the corresponding tongue 12 of the outer section slides beneath the tongue 15 of the same (outer) section, and the overlapping face portions 16 of the offset tongues 12 and 14 slide along each other. It will be observed that the longitudinal joint between the tongues 12 and 15, the vertical joint between the overlapping portions of tongues 14 and 16, and the longitudinal joint between the tongues 11 and 14 make up a transverse stepped ring joint, so that no matter at what points between the ring sections leakage may attempt to occur, it is effectively blocked by a stepped joint.

Mere assembly of the two ring sections forms the joint for the complete ring, no machining is necessary to complete the joint after the parts are nested.

The inner and outer ring sections 1 and 2 may both be iron, steel, or alloy, or one may be of one kind of metal and the other of another kind, either cast or wrought. Whether the ring sections are of one kind or another or of different metals or materials, cast or wrought, a laminated ring of itself has greater strength and elasticity than a non-laminated ring, due to the thinness and individual properties of each component layer, which layers may or may not be of equal or unequal thicknesses. This is important when the ring is expanded to slip over a piston, since breakage, so common with most rings, is avoided.

A laminated ring, having both of its laminations of cast iron, will be found to have greater strength and elasticity than a solid cast iron ring, and these factors may be improved by varying the metals used for both sections, or for one or the other thereof.

By employing metals or materials having different coefficients of expansion for the two ring sections, still greater benefits are obtained from the laminated construction herein employed. A bi-metallic ring will change its tension under temperature changes, permitting an internal combustion or other engine to start with less friction and wear, since the pistons will not be retarded by dry rings and a greater oil film will be possible on the cylinder walls of a cold engine. As the engine warms up, the oil will thin out and the rise of engine temperature will also increase the spring tension of the ring up to normal requirements. Of course it is to be understood that the material used in one ring or the other must be proper to cause this expansion. For example, if cast iron is used for both sections, the inner one may be alloyed with a small amount of nickel, or bronze, the adulteration may be in some cases 5%, but usually according to the degree of expansion desired in a particular job. In certain instances, both ring sections may be merely of different grades of iron; in others, one may be cast and the other wrought, with or without bi-metallism. Usually, a bi-metallic ring is preferable.

Steel is a metal that has not been satisfactorily used in piston ring construction for many reasons, some of which will be pointed out. The spring tension of a steel ring is on when the engine is cold since its spring tension is continuous whether the cylinder walls are cold or hot, thus not only interfering with starting for reasons previously given, but causing as much wear upon the cylinder walls during the first five minutes before the engine warms up as would occur in one hundred miles running at normal operating temperature. The molecular consistency of steel is such that it has a glass-smooth surface and no pockets for the retention of lubricant to be present during starting. The cast iron cylinder walls do have these oil pockets, but steel rings of ordinary construction would continuously wear the same out and reduce the life of the cylinder. By using a thermally expansible ring, steel may be used, since the size of the ring may be such that upon starting it will not have to plow through the congealed oil film upon the cylinder walls, but will pass over the same, gradually expanding as the oil thins out, permitting the oil film to function as a lubricant during the warming up period of the engine as well as normally.

If, for any reason, steel is not particularly desirable for the outer ring section, cast iron or another metal, material, or alloy may be used for the outer section, the steel serving only for the material of the inner ring. A steel inner ring section is desirable in certain instances as a spring expander for the outer ring section, even when thermal action is not the particular desideratum sought.

Steel and other more flexible and durable materials have the advantages of being workable to shape by rolls, whereas cast iron rings must be subjected to numerous and expensive operations for effective action, avoided by this invention.

A thermally expansible ring permits the number of rings necessary on a piston to be less than ordinarily required, and increases oil economy and consequently reduces carbon accumulation, and gives longer life and sustained speed operation without leakage by decreasing wear due to ring friction.

Obviously the number of laminations may be increased to three or more by nesting each additional ring section with its joint offset from the others in the same manner as the first two ring sections are nested.

What is claimed:

1. A piston ring composed of independently formed ring sections each having a stepped joint formed by offset cuts from the upper and lower edges of the section and a communicating cut from one to the other of said offset-cuts and to one side of the longitudinal center of the section, one section being reversed and nested within the other so that its joint cuts are adjacent and offset from similar joint cuts of the other ring section, and means securing the ring sections together against material leakage between them throughout the greater portion of their circumference.

2. A piston ring composed of similar ring sections except as to diameter, said ring sections having stepped joints, one section being nested within the other with its stepped joint offset from the stepped joint of the other section, said offset portions of the joints of the two ring sections producing a stepped joint extending transversely of the complete ring, and means securing the ring sections together throughout the greater portion of their circumference except adjacent their joints.

3. A piston ring composed of ring sections secured to each other and each having a joint involving offset cuts from the upper and lower edges of the section and a communicating cut from one to the other of said offset cuts, the offset cuts of one section being offset from the offset cuts of the other section and said communicating cut of one section being offset from the communicating cut of the other section, the area embracing the joint of one section overlapping the area embracing the joint of the other section, thereby affording a single joint opening for the ring as a whole.

4. A piston ring composed of ring sections, the material of the ring sections having different coefficients of expansion, the ring sections being secured to each other and each having a joint involving offset cuts from its upper and lower edges and a communicating cut from one to the other of said offset cuts; the offset cuts of one section being offset from the offset cuts of the other section and said communicating cut of one section being offset from the communicating cut of the other section, the area embracing the joint of one section overlapping the area embracing the joint of the other section affording a single joint opening for the ring as a whole.

5. A split piston ring formed of an inner and outer section joined to each other and each having overlapping free ends forming said split, said split including a longitudinal cut in each of said sections, said longitudinal cuts of each section being offset axially whereby a lateral seal is established between said longitudinal cuts.

6. A split piston ring formed of two sections of metal each having a different coefficient of expansion, said ring comprising an outer section and an inner section, said sections being united substantially throughout their major portions of their circumferences, each of said sections having a stepped joint having overlapping free ends, the joint of one section being arranged substantially adjacent the joint of the other, whereby the split of the ring as a whole is included in a minor portion of the circumference of the ring, said joints having corresponding portions offset circumferentially and other corresponding portions offset axially whereby the ring as a whole is sealed at its joint radially as well as axially.

LLEWELLYN T. BARNES.